(12) United States Patent
Schaeffer et al.

(10) Patent No.: US 6,274,274 B1
(45) Date of Patent: Aug. 14, 2001

(54) MODIFICATION OF THE SHAPE/SURFACE FINISH OF BATTERY GRID WIRES TO IMPROVE PASTE ADHESION

(75) Inventors: Charles J. Schaeffer, Wauwatosa; Jeffrey L. Troxel, Menomonee Falls; M. Eric Taylor, Shorewood; Wen-Hong Kao, Brown Deer; Christian P. Hansen, Eagle; Yu-Lin Chen, Menomonee Falls; Dan J. Cantillon, Sussex; Bart Sauer, Menomonee Falls, all of WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/351,418

(22) Filed: Jul. 9, 1999

(51) Int. Cl.[7] .................................................. H01M 4/72
(52) U.S. Cl. ..................... 429/233; 429/211; 429/225; 429/241; 429/243; 429/244; 29/2
(58) Field of Search ..................... 429/211, 225, 429/233, 241, 243, 244; 29/2

(56) References Cited

U.S. PATENT DOCUMENTS

| 3,398,024 | 8/1968 | Barnes et al. ............................ 136/34 |
| 3,556,854 | 1/1971 | Wheadon et al. ....................... 136/37 |
| 3,909,293 | 9/1975 | Hammond et al. ...................... 136/36 |
| 3,933,524 | 1/1976 | Hughel et al. ............................ 136/64 |
| 3,947,936 | 4/1976 | Wheadon ..................................... 29/2 |
| 3,959,016 | 5/1976 | Tsuda ....................................... 136/67 |
| 4,016,633 | * 4/1977 | Smith et al. .................................. 29/2 |
| 4,151,331 | 4/1979 | Hug et al. ................................ 429/94 |
| 4,196,757 | 4/1980 | Hug et al. ............................... 141/1.1 |
| 4,221,852 | 9/1980 | Qureshi ................................. 429/211 |
| 4,305,187 | * 12/1981 | Iwamura et al. ............................. 29/2 |
| 4,906,540 | 3/1990 | Hoshihara et al. .................... 429/242 |
| 4,982,482 | * 1/1991 | Wheadon et al. ........................... 29/2 |
| 5,543,250 | 8/1996 | Yanagihara et al. .................. 429/241 |
| 5,582,936 | 12/1996 | Mrotek et al. ........................ 429/241 |
| 5,611,128 | * 3/1997 | Wirtz ........................................... 29/2 |
| 5,851,695 | * 12/1998 | Misra et al. .......................... 429/159 |
| 5,858,575 | 1/1999 | Chen ..................................... 429/245 |

FOREIGN PATENT DOCUMENTS

WO 99/27595   6/1999   (WO).

OTHER PUBLICATIONS

Patent Abstract for JP 11–054115; Publication Date: Feb. 26, 1999.
Patent Abstract for JP 10–284085; Publication Date: Oct. 23, 1998.
PCT Search Report for PCT/US00/18114.

* cited by examiner

Primary Examiner—Gabrielle Brouillette
Assistant Examiner—Dah-Wei D. Yuan
(74) Attorney, Agent, or Firm—Quarles & Brady LLP

(57) ABSTRACT

A method of forming battery grids or plates that includes the step of mechanically reshaping or refinishing battery grid wires to improve adhesion between the battery paste and the grid wires. The method is particularly useful in improving the paste adhesion to battery grids formed by a continuous battery grid making process (such as strip expansion, strip stamping, continuous casting) that produces grid wires and nodes with smooth surfaces and a rectangular cross-section. In a preferred version of the method, the grid wires of battery grids produced by a stamping process are deformed such that the grid wires have a cross-section other than the rectangular cross-section produced by the stamping process. The method increases the cycle life of a battery.

28 Claims, 6 Drawing Sheets

MODIFICATION OF THE SHAPE/SURFACE FINISH OF BATTERY GRID WIRES TO IMPROVE PASTE ADHESION

BACKGROUND OF THE INVENTION

1. Field of the Invention

The present invention relates to the modification of battery grids of the type used in lead-acid storage batteries, and more particularly, it relates to a modification of the shape and/or surface finish of the battery grids of a lead-acid storage battery to improve paste adhesion and the service life of the battery.

2. Description of the Related Art

Lead-acid storage batteries typically comprise several cell elements which are encased in separate compartments of a container containing sulfuric acid electrolyte. Each cell element includes are least one positive plate, at least one negative plate, and a porous separator positioned between each positive and negative plate. The positive and negative plates each comprise a lead or lead alloy grid that supports an electrochemically active material. The active material is a lead based material (i.e., PbO, $PbO_2$, Pb or $PbSO_4$ at different charge/discharge stages of the battery) that is pasted onto the grid. The grids provide an electrical contact between the positive and negative active materials which serves to conduct current.

The active material of a lead-acid battery may be prepared by mixing lead oxide, sulfuric acid and water. Dry additives, such as fiber and expander, may also be added. The active material paste is then applied to the lead grid. The pasted plates are next typically cured for many hours under elevated temperature and humidity to oxidize free lead (if any) and adjust the crystal structure of the plate. After curing, the plates are assembled into batteries and electrochemically formed by passage of current to convert the lead sulfate or basic lead sulfate(s) to lead dioxide (positive plates) or lead (negative plates). This is referred to as the "formation" process.

The formation efficiency of lead-acid batteries depends to a great extent on the positive plate, in particular, to the extent of conversion of lead monoxide (PbO) to lead dioxide ($PbO_2$) in the active positive material. The high electrical potential required for formation appears to be related to the transformation of non-conductive paste materials to $PbO_2$. A low formation efficiency of positive plates requires a high formation charge. Inefficient charging also leads to deficiencies in the resulting batteries assembled with such plates. Typically, the initial capacity (performance) of the battery is low if the battery is not completely formed, requiring additional cycling to reach specific performance values.

The formation process has been studied for some time and it is recognized that a number of variables affect formation efficiency. For instance, it is well known that by increasing the adhesion between the paste mixture and the grid, formation efficiency can be improved. Among other things, the increased adhesion between the grid and the paste provides for improved interfacial contact between the grid and paste thereby improving current flow between the grid and paste. Accordingly, certain efforts to improve battery formation efficiency have focussed on improving the adhesion between the battery grid and paste. For example, U.S. Pat. No. 3,398,024 discloses a method for obtaining better adhesion of battery paste to a lead grid by dipping the grid in a persulfate or perborate solution prior to pasting, and then pasting the grid while it is still wet.

It is also recognized that improved adhesion between battery paste and the grid can increase the service (cycle) life of a battery. It is well known that lead-acid batteries will eventually fail in service through one or more of several failure modes. Among these failure modes is failure due to corrosion of the grid surface. Electrochemical action corrodes the grid surface and reduces the adhesion between the active material and the grid. In most instances, failure of the battery occurs when the grids are no longer able to provide adequate structural support or current flow due to the separation of the active material from the grid. Therefore, there have been efforts to improve the service life of a lead-acid battery by increasing the adhesion of the grid material to the active paste material.

For example, U.S. Pat. No. 3,933,524 discloses a method of increasing the cycle life of a battery wherein antimony is deposited on a lead alloy grid in order to promote adhesion of the active materials to the grid. It is stated that the antimony may be deposited in a number of ways including electroplating, spraying, vapor deposition, sputtering and chemical displacement.

A similar method of extending the cycle life of a lead-acid storage battery is disclosed in U.S. Pat. No. 5,858,575. In this method, a lead-calcium alloy substrate is coated with a layer of a tin, lead-antimony, lead-silver or lead-tin alloy. The layer of metal on the surface of the grid promotes better adhesion of the active material paste to the grid.

Another similar method is described in U.S. Pat. No. 4,906,540 which discloses a method wherein a layer of a lead-tin-antimony alloy is roll-bonded to a grid base formed of a lead-calcium alloy. It is stated that the surface layer of the lead-tin-antimony alloy enables the battery active material to be retained for a long period of time. The increased adhesion of the paste to the grid serves to improve the cycle life of the battery.

Yet another similar method is described in Japanese Patent Publication No. 10-284085 which discloses a method wherein a coating of a lead-antimony-selenium alloy is fused to a lead-calcium-tin alloy strip and the strip is punched and/or expanded to form battery grids. The grids formed by this process are believed to increase battery life.

Still another similar method is described in Japanese Patent Publication No. 11-054115 which discloses a method wherein a pre-coating of a dense oxide is applied to a battery grid in order to improve paste adhesion in the battery pasting process.

Thus, it can be seen that the adhesion between a battery grid and battery active material may affect, among other things, battery formation processes and battery service life. Accordingly, various methods, such as those mentioned above, have been proposed to improve the adhesion between a battery grid and battery active material.

While these methods may provide satisfactory solutions to the problem of inadequate paste adhesion, they do have certain disadvantages. For example, each of these processes requires the incorporation of an additional material into the grid manufacturing process. In certain processes, the grid must be treated with an additional chemical (e.g., a persulfate or perborate solution, or an oxide). In other processes, an additional layer of a dissimilar metal or alloy must be deposited on the grid by chemical (e.g., electroplating) or mechanical (e.g., roll-bonding) means. It can be appreciated that the additional process steps and materials required in these methods can significantly increase the cost of manufacturing the battery grids. As a result, certain battery manufacturers may be reluctant to incorporate these methods into a production facility.

It is apparent that previous attempts at improving paste adhesion have focussed on the compatibility problems between battery paste materials and the alloys or coatings at the surface of the battery grid. Accordingly, proposed solutions to the problems of paste adhesion have involved the application of a dissimilar metal or coating to the grid surface.

However, it has been discovered that another source of the problem of inadequate paste adhesion may be the configuration of the grid. Consequently, the effect of different battery grid making processes on paste adhesion has been further examined.

As detailed above, grids for lead acid batteries provide structural support for the active material therein, and serve as a current collector during discharge and a current distributor during recharge. Known arts of lead acid battery grid making include: (1) batch processes such as book mold gravity casting; and (2) continuous processes such as strip expansion, strip stamping, continuous casting, and continuous casting followed by rolling. Grids made from these processes have unique features characteristic of the process and behave differently in lead acid batteries, especially with respect to the pasting process.

In the book mold casting process, molten lead is poured into a grid mold and cooled to form a grid. The surface of the grid made from book mold casting is somewhat rough and the geometric shape of the cross-section of the grid wires is usually oval with a sharp angle formed at the plane where the book mold closes. Book mold casting is a batch process and its productivity is much lower than other processes that are continuous in nature.

In the strip expansion process, a cast or wrought lead strip is pierced, stretched above and below the strip plane, and then pulled or expanded to form a grid with a diamond pattern. The surface of the wires perpendicular to the plane of the strip is smooth and the cross-section of the wires is rectangular. Stamped grids also have smooth surfaces and a rectangular cross-section in the wires. For continuous casting, the surface of the grid can be rough on the mold side and is smooth on the belt/air side. The geometry of the cross-section of the wires produced by continuous casting can be a triangle, a trapezoid, a section of an arc or a semi-circle, depending on the mold design. If the grids are rolled after casting, the surfaces become smooth and the cross-section of the grid wires become rectangular.

When applying battery paste to a grid, an oval-shaped wire, such as that in a book mold cast grid, allows the paste to flow around the wire. The rough surface and the sharp angle of the wires provide a mechanical graft and interlock of paste particles. Therefore, the contact between the grid and the battery paste is good and the plate is strong. With rectangular wires, on the other hand, it is much more difficult to make good contact between the battery paste and the surface of the wire moving in a direction perpendicular to the direction in which the paste is applied because the flow of paste must change in a 90 degree step. This is analogous to the situation where water flows down a 90 degree cliff, and the surface right below the edge of the cliff is not contacted by the falling water. With a grid wire orientation other than 90 degrees, the change of paste flow is gradual and continuous and therefore, provides better paste coverage. When the battery paste is cured and dried, it will shrink and generate tensile force at the paste/grid interface. The tensile force at the paste/grid wire interface is at a maximum when the wire surface is perpendicular to the grid surface and at a minimum when the wire surface is parallel to the grid surface. As a result, a gap is formed between the grid wire and the paste at the location where the tensile force is the maximum. This type of plate is weak and the paste will fall off easily. Because of a lack of contact between the paste and the grid, a battery made with this type of plate is much more difficult to form, performs poorly in certain reserve capacity tests, and does not exhibit satisfactory cycle life.

Therefore, there continues to be a need in the battery manufacturing field for alternative methods for improving the adhesion of battery paste active material to the battery grid. More particularly, there is a need for a method that can increase the adherence of battery active material to a battery grid produced by a continuous process, such as strip expansion, strip stamping, or continuous casting, without the need for additional materials such as treatment chemicals or metal coatings.

It is therefore an object of the present invention to provide a method that increases the cycle life of a battery by enhancing the adhesion between the battery active material and the battery grid.

It is a further object to provide a method that increases the formation efficiency of a battery by enhancing the adhesion between the battery paste material and the battery grid.

It is yet another object to provide a method that can modify the wires of a battery grid made from a continuous process to mimic the wire shape observed in a book mold gravity cast battery grid so that the paste can flow around the grid wires to improve the plate strength.

It is yet another object of the present invention to provide a method of making battery grids that allows a battery manufacturer to take advantage of a low cost continuous grid making process without the drawbacks associated with inadequate paste adhesion such as reduced formation efficiency and reduced cycle life.

SUMMARY OF THE INVENTION

The foregoing needs in the art and the foregoing objects are achieved by a method of forming battery grids or battery plates that includes the step of mechanically reshaping or refinishing battery grid wires to improve contact between the battery paste and the grid wires. As a result of this reshaping or refinishing of the grid wires, paste adhesion is increased thereby increasing battery formation efficiency and battery cycle life.

In one version of the invention, a battery grid is formed by a method that includes the steps of forming a preform battery grid and then reshaping or refinishing the grid wires of the preform battery grid to form a finished grid. The preform battery grid includes a grid network bordered by a frame element on at least one side. The top frame element has a current collector lug. The grid network comprises a plurality of spaced apart grid wire elements with opposed ends. Each of the opposed ends of each grid wire is joined to one of a plurality of nodes to define open spaces in the grid network. In the reshaping or refinishing step, at least a portion of the grid wire elements of the preform battery grid are deformed at a position between the opposed ends of the grid wire element. After deformation, a first transverse cross-section taken at a position intermediate between the opposed ends of the grid wire element differs from a second transverse cross-section taken at one of the opposed ends of the grid wire element. This version of the invention is particularly useful in improving the paste adhesion to individual battery grids formed by a continuous process (such as strip expansion, strip stamping, continuous casting) that produces grid wires and nodes with smooth surfaces and a rectangular cross-section. For example, individual grids formed by stamping process will typically have grid wires and nodes with smooth surfaces and a generally rectangular cross-section. In this version of the invention, the grid wires of the battery grids produced by the stamping process are deformed such that the grid wires have a cross-section other than the rectangular cross-section produced by the stamping process. The nodes and the opposed ends of each grid wire that are attached to each node retain a generally rectangular cross-section so that the grid surface retains a planar configuration.

While the method of the invention is advantageous when applied to individual battery grids, it is particularly advantageous when employed as part of a continuous battery plate making process. For instance, another version of the invention includes the steps of forming a strip of interconnected battery grids from a grid material, reshaping or refinishing the grid wires of each of the interconnected battery grids, applying battery paste to the strip, and cutting the strip to form a plurality of battery plates. In this version of the invention, each of the interconnected battery grids includes a grid network bordered by a frame element on at least one side. The top frame element has a current collector lug. The grid network comprises a plurality of spaced apart grid wire elements with opposed ends. Each of the opposed ends of each grid wire is joined to one of a plurality of nodes to define open spaces in the grid network. In the reshaping or refinishing step, at least a portion of the grid wire elements of the interconnected battery grids are deformed at a position between the opposed ends of the grid wire element. In this version of the invention, the strip of interconnected battery grids may be formed from a grid material by any of a number of methods including: (1) a stamping process wherein a continuous strip of grid material is fed along a path and grid material is punched out of the strip to form the strip of interconnected battery grids; (2) a continuous casting process wherein a grid material is melted and continuously cast to form the strip of interconnected battery grids; or (3) a strip expansion process wherein a continuous strip of grid material is fed along a linear path, apertures are pierced in the strip of grid material, and the strip is laterally expanded to form the strip of interconnected battery grids. In this version of the invention, the grid wires may be reshaped or refinished in a variety of manners. In one variation of this version of the invention, the grid wires are deformed by a stamping die at a position between the opposed ends of the grid wire element.

The present invention also relates to a battery grid formed using the method of the present invention. The improved battery grid has a grid network bordered by a frame element on at least one side. The top frame element has a current collector lug. The grid network comprises a plurality of spaced apart grid wire elements, wherein each grid wire element has opposed ends and each of the opposed ends is joined to one of a plurality of nodes to define a plurality of open spaces. At least a portion of the grid wire elements have a first transverse cross-section taken at a position between the opposed ends of the grid wire element that differs from a second transverse cross-section taken at one of the opposed ends of the grid wire element. In other words, the intermediate portion of the grid wire has a shape different from the shape of the opposed ends of the grid wire where the grid wire and node meet. The cross-section of the intermediate portion of the grid wire may be any number of shapes including diamond, rhomboid, hexagon, octagon or oval. Alternatively, the intermediate portion of the grid wire elements may have a cross-section that is rotated about 20 to about 70 degrees in relation to the cross-section of the opposed ends of the grid wire where the grid wire and node meet. In this version of the invention, it is preferred that a major portion of the intermediate portion of the grid wire elements be rotated about 20 to about 70 degrees.

BRIEF DESCRIPTION OF THE DRAWINGS

These and other features, aspects, objects, and advantages of the present invention will become better understood upon consideration of the following detailed description, appended claims and accompanying drawings where:

Figure 1:
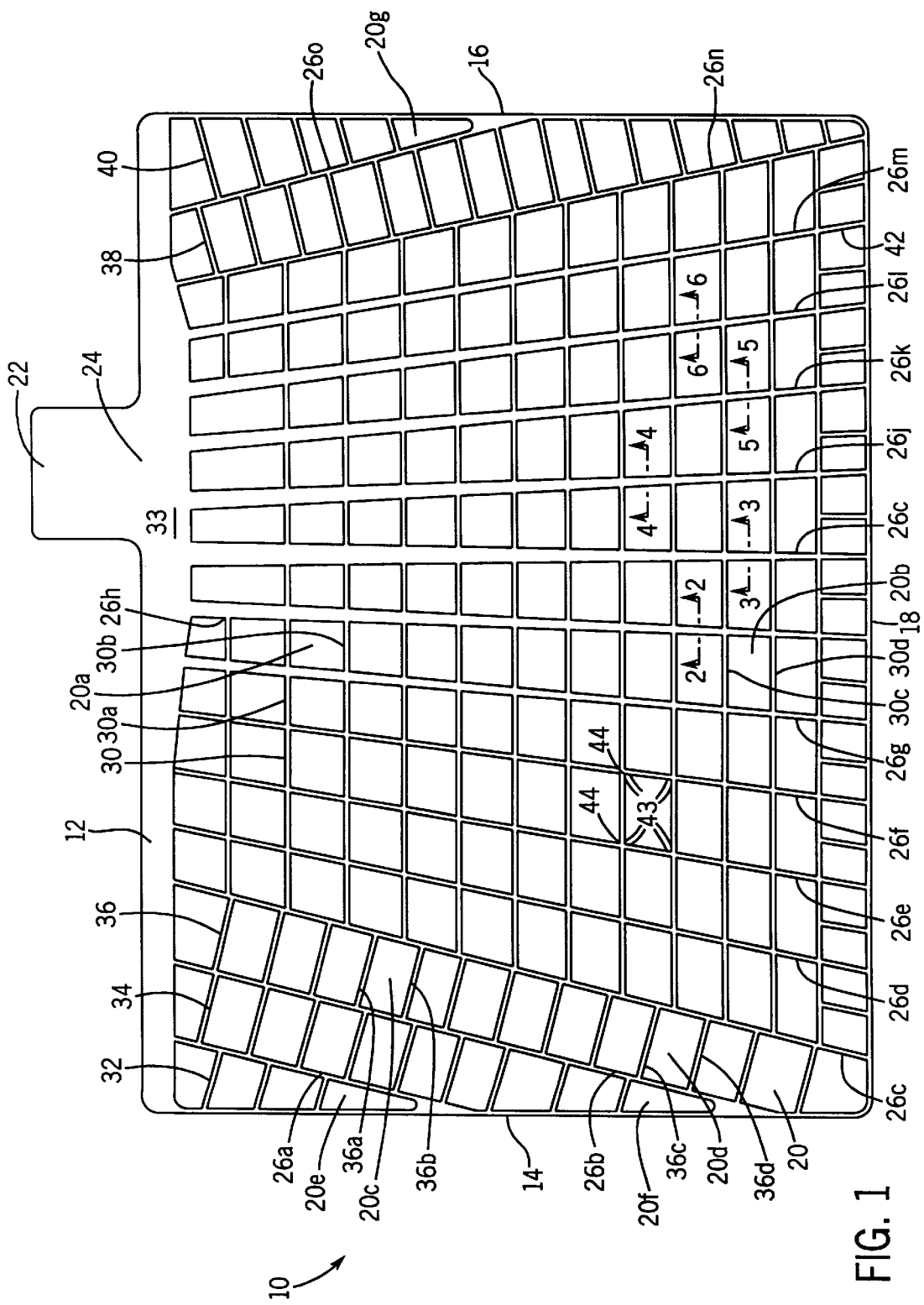
FIG. 1 shows a front view of a battery grid made in accordance with one version of the method of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DETAILED DESCRIPTION OF THE INVENTION

FIG. 1 shows a front view of a battery grid made in accordance with one version of the method of the present invention. The grid is a stamped grid made of a lead alloy, and functions in the same manner as other battery grids known in the art. It should be noted that an infinite number of grid designs may result from the present invention and therefore, it is not the intent of the following description to limit the invention to the grid design shown in FIG. 1, which is presented for the purposes of illustration.

Referring now to FIG. 1, the grid 10 comprises a frame that includes a top frame element 12, first and second side frame elements 14 and 16, and a bottom frame element 18. The grid 10 includes a series of grid wires that define open areas 20 that hold the electrochemical paste (not shown) that provides the current generation. A current collection lug 22 is integral with the top frame element 12 and is offset from the center of the top frame element 12. The top frame element 12 includes an enlarged conductive section 24 directly beneath the lug 22, and has the shape shown to optimize current conduction to the lug 22.

A series of radially extending vertical grid wire elements 26(a)–26(o) form part of the grid 10. The vertical wire elements 26(c)–26(n) are connected to the top frame element 12 and the bottom frame element 18, the vertical wire elements 26(a)–26(b) are connected to the top frame element 12 in the first side frame element 14, and the vertical wire element 26(o) is connected to the top frame element 12 and the side frame element 16, as shown. The vertical wire element 26(i) is parallel to the side elements 14 and 16, and the remaining vertical wire elements 26(a)–26(h) and 26(j)–26(o) extend radially toward an imaginary intersecting point along a radius line running through the vertical element 26(i). The vertical wire elements 26(a)–26(o) become closer together when moving from the bottom element 18 towards the top element 12 and get farther apart when moving towards the left element 14 or the right element 16 from the vertical element 26(i).

The grid 10 also includes a plurality of horizontal or cross wire elements. The cross wire elements include a set of parallel horizontal wire elements 30 positioned in a middle portion of the grid 10. Additionally, the grid 10 includes a first set of cross wire elements 32 connected between the left frame element 14 and the vertical element 26(a) that are parallel to each other, a second set of cross wire elements 34 connected between the vertical elements 26(a) and 26(b) that are parallel to each other, and a third set of cross wire elements connected between the vertical elements 26(b) and 26(c) that are parallel to each other at the left side of the grid 10. Also, the grid 10 includes a fourth set of cross wire elements 38 connected between the vertical elements 26(n) and 26(o) that are parallel to each other and a fifth set of cross wire elements 40 connected between the vertical element 26(o) and the right frame element 16 that are parallel to each other at the right side of the grid, as shown. A series of short support wires 42 are connected to the bottom frame member 18 as shown.

Individual sections of the vertical wire elements 26(a)–26(o) and the horizontal wire elements 30 or the cross wire elements 32–40 have opposed ends 43 which are joined at a plurality of nodes 44 that define the open areas 20 that support the electrochemical paste for conduction.

The grid wire cross-sections shown in FIGS. 2–5 illustrate various versions of a grid wire section formed by the method of the invention described below. In the battery grid, each grid wire section may have a different cross-sectional configuration, or each grid wire section may have the same cross-sectional configuration. However, it is preferred that each grid wire section have the same cross-sectional configuration. It is also important to note that although certain features of the invention have been illustrated in FIGS. 2–5 by way of cross-sectional views of vertical grid wires, the same cross-sectional views could apply when taking a cross-section of horizontal grid wires. In other words, the similar deformation methods as illustrated in FIGS. 2 to 5 can also be applied to the horizontal wire elements. Depending on the needs, a grid can be deformed at the vertical wire elements only, or at both the vertical and horizontal wire elements.

Figure 2:
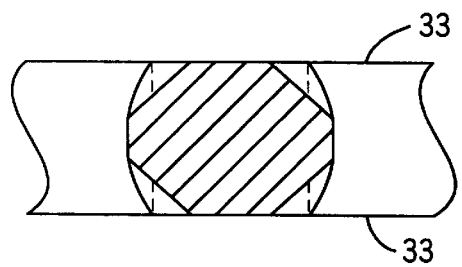
FIG. 2 shows a cross-section of a vertical grid wire section taken along line 2—2 of FIG. 1.

FIG. 2 shows a cross-section of a section of vertical wire element 26(h) taken at a position between the opposed ends of the grid wire section. It can be seen that at the position between the opposed ends of this grid wire section, the cross-section of the grid wire is substantially an octagon, while the cross section of the node and the end of the grid wire section (which are shown in phantom) are substantially rectangular. It can be appreciated by those in the art that a battery grid wire section or node will not have a perfect geometric configuration and that the rounding of edges and corners of a grid wire section or node is often the result of a manufacturing operation. For this reason, the description of cross-sectional shapes in the specification will be proceeded by the word "substantially" to indicate that the cross-sectional shape may vary somewhat from a perfect geometric shape.

Figure 3:
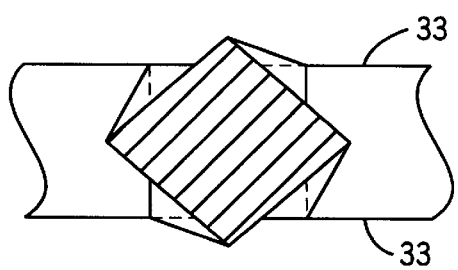
FIG. 3 shows a cross-section of a vertical grid wire section taken along line 3—3 of FIG. 1.

FIG. 3 shows a cross-section of a section of vertical wire element 26(i) taken at a position between the opposed ends of the grid wire section. It can be seen that at the position between the opposed ends of this guid wire section, the cross-section of the grid wire has been rotated 45 degrees in relation to the node and the end of the grid wire section (shown in phantom), which have a substantially rectangular cross-section.

Figure 4:
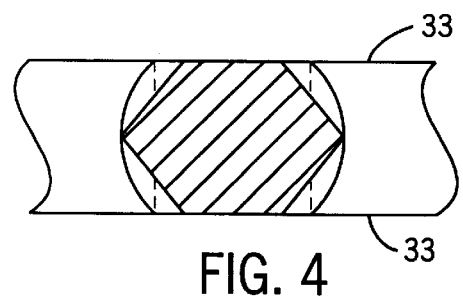
FIG. 4 shows a cross-section of a vertical grid wire section taken along line 4—4 of FIG. 1.

FIG. 4 shows a cross-section of a section of vertical wire element 26(j) taken at a position between the opposed ends of the grid wire section. It can be seen that at the position between the opposed ends of this grid wire section, the cross-section of the grid wire is substantially a hexagon, while the cross section of the node and the end of the grid wire section (which are shown in phantom) are substantially rectangular.

Figure 5:
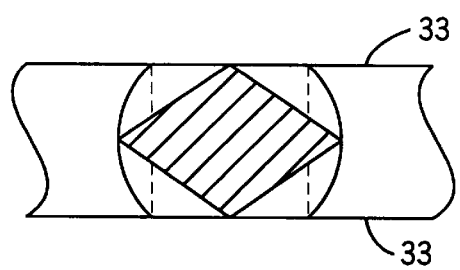
FIG. 5 shows a cross-section of a vertical grid wire section taken along line 5—5 of FIG. 1.

FIG. 5 shows a cross-section of a section of vertical wire element 26(k) taken at a position between the opposed ends of the grid wire section. It can be seen that at the position between the opposed ends of this grid wire section, the cross-section of the grid wire is substantially a diamond, while the cross section of the node and the end of the grid wire section (shown in phantom) are substantially rectangular.

Figure 6:
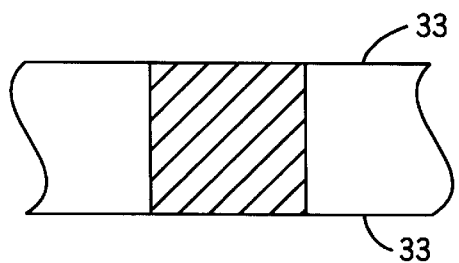
FIG. 6 shows a cross-section of a vertical grid wire section taken along line 6—6 of FIG. 1.

FIG. 6 shows a cross-section of a section of vertical wire element 26(l) taken at a position between the opposed ends of the grid wire section. This figure shows the configuration of a conventional stamped battery grid wherein the cross section of the node and the cross-section at all positions along the grid wire section are substantially rectangular and the surfaces of the node and grid wire section are smooth.

Upon review of FIGS. 2–5, it can be seen that in the embodiments shown in FIGS. 2, 4 and 5, the deformed cross-sectional area of each grid wire does not extend above or below opposed flat planar surfaces 33 of the grid. In FIG. 3, the rotated cross-section of the grid wire does extend above and below the planar surfaces 33 of the grid because of the nature of the forming process used to deform the grid wire. The opposed planar surfaces 33 of the grid are formed by the grid network and the frames, and may vary slightly from a geometric flat planar surface due or manufacturing variability.

The grid shown in FIGS. 1–5 may be manufactured by any of a number of versions of the method of the present invention. In a preferred version of the invention, the battery grid is produced as part of an automated battery plate making process that includes grid stamping operations. In this version of the invention, a conventional lead or lead alloy battery grid material (such as a lead-calcium-tin alloy) is melted and continuously cast to form a continuous strip of grid material. The continuous strip may then be rolled to modify the thickness or grain structure of the strip. A series of interconnected battery grids is then formed by punching grid material out of the continuous strip.

During the punching operations, the strip is maintained as a continuous strip and preferably the interconnected grid shapes are formed in a progressive punching operation, i.e. features are added to the battery grid through several punching operations. Preferably, each of the interconnected battery grids has a grid network bordered by a frame as shown in FIG. 1 and described above. However, it is also possible to form interconnected battery grids having a grid network bordered by one or more separate frame elements.

After the punching operations form a strip having interconnected grids, the battery grid wire sections of the strip are processed in a stamping station. The stamping station is used to deform or coin the grid wires so that the grid wires have a cross-section similar to one of the grid wire cross-sections shown in FIGS. 2–5. For instance, the stamping station may include a die that deforms the rectangular cross-section of the grid wires of the punched grid into an octagonal cross-section as shown in FIG. 2. Alternatively, a stamping die may be used that rotates the intermediate portion of the grid wire elements about 20 to about 70 degrees in relation to the cross-section of the opposed ends of the grid wire where the grid wire and node meet as depicted in FIG. 3.

It can be appreciated that any number of modified grid wire shapes can be selected as long as the shape provides paste adhesion characteristics that are superior to the rectangular cross-section produced by a stamping process. Preferably, the modified grid wire substantially has a diamond shape, a rhomboid shape, a hexagon shape, an octagon shape, or an oval shape. When deforming the grid wires in the stamping station, the area of deformation along the length of the grid wire between the opposed ends of each grid wire section may vary. For example, it is preferred that 90% of the length of the grid wire between the opposed ends of the grid wire undergo deformation at the stamping station. Using FIG. 2 as a reference, this means that 5% of the grid wire length near one end of the grid wire section would have a rectangular cross-section, the center 90% of the grid wire length would have a substantially octagonal cross-section, and 5% of the grid wire length near the other end of the grid wire section would have a rectangular cross-section. While it is preferred that the nodes remained undeformed in this version of the invention, in certain circumstances it may be advantageous to deform or coin the nodes in the stamping station. Since coining of the nodes as well as the grid wires will tend to make the grid strip non-planar, pasting operations which tend to apply paste more thickly to one side of the plate than the other can benefit from this effect. The grid strip can then be oriented so that paste can more readily flow to the surface which is thinly pasted, i.e., fed into the pasting machine so that the concave side faces the direction that otherwise would be thinly pasted, typically the bottom.

The interconnected grids having modified grid wires are then processed to apply battery paste and the strip is cut to form a plurality of battery plates. Alternatively, the interconnected grids may be cut into a plurality of grids before pasting and stored for later use.

In other versions of the method of the invention, the interconnected battery grids may be formed by alternate means, such as strip expansion or continuous casting processes. In strip expansion, a continuous strip of grid material is fed along a linear path aligned with the longitudinal direction of the strip, apertures are punched in the strip of grid material, and the strip is laterally expanded to form the strip of interconnected battery grids. In the continuous casting process, the grid material is melted and continuously cast to form the strip of interconnected battery grids. Optionally, the continuous cast strip may be rolled to achieve dimensional control or grain structure modification. When these alternate means for forming the strip of interconnected battery grids are used, the strip of grids is still further processed in a stamping station in order to modify the rectangular cross-section of the grid wires produced in the strip expansion or continuous casting process.

FIGS. 11–14 show a battery grid that was formed using the version of the method of the present invention wherein the grid openings are continuously punched out of a lead alloy strip and the grid wires are subjected to a coining deformation step in a stamping station. It can be seen that the areas where the opposed ends of the grid wire sections meet the nodes were not subjected to deformation and therefore, the areas retain the shape formed in the continuous punching operation. It can also be seen that the areas of the grid openings near the nodes have a slight inner radius that results from the process.

The invention is further illustrated in the following Examples which are presented for purposes of illustration and not of limitation.

EXAMPLE 1

Figure 7:
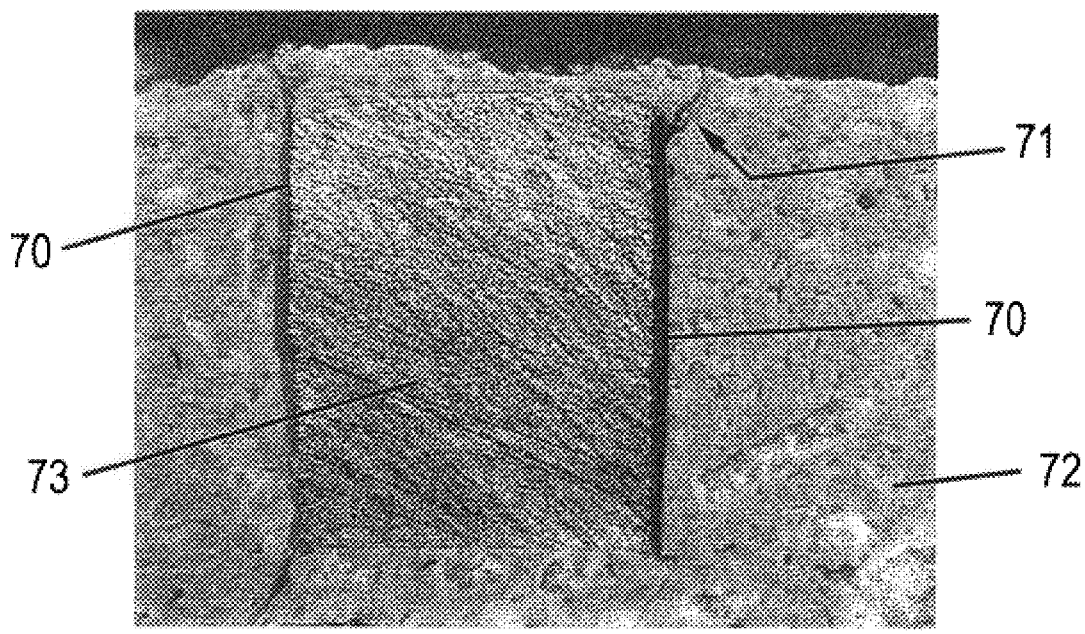
FIG. 7 is a photomicrograph of a transverse cross-section of a battery plate prepared using a conventional stamped battery grid.

A conventional stamped battery grid with grid wires having a rectangular cross-section and smooth surfaces (as depicted in FIGS. 1 and 6) was pasted with a conventional positive paste for lead acid batteries and then cured. The cured plate was sectioned with a cutting wheel in a direction transverse to the planar surface of the plate, polished, and photographed. The photograph is shown in FIG. 7. As FIG. 7 shows, the cured plate exhibits gaps 70 at the paste 72/grid wire 73 interfaces, and the gaps extend into the bulk paste as cracks 71.

EXAMPLE 1(a)

Figure 8:
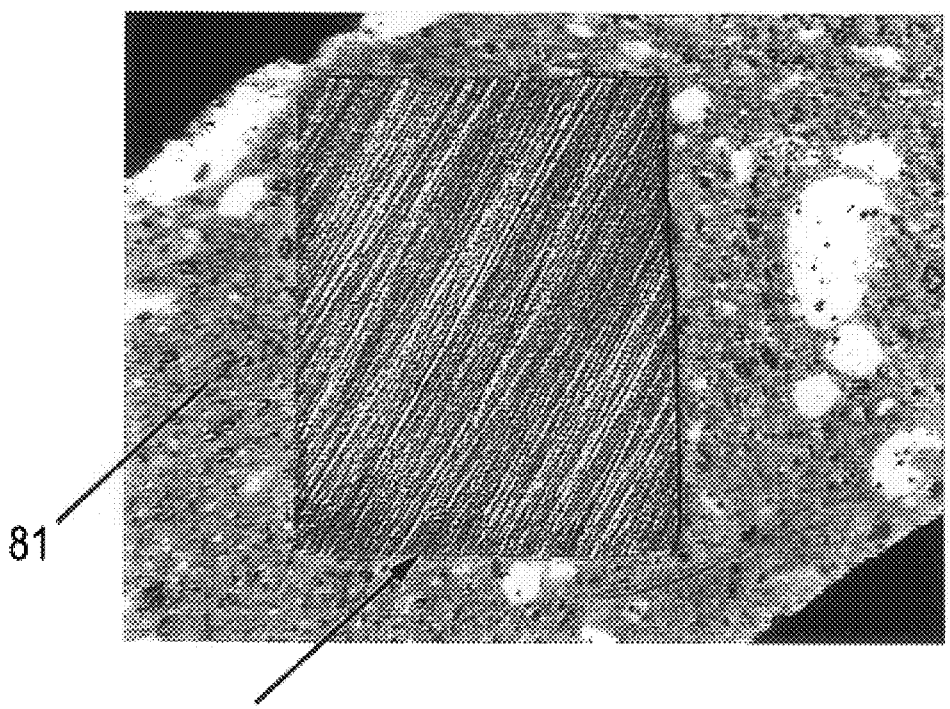
FIG. 8 is a photomicrograph of a transverse cross-section of a battery plate prepared using one version of a battery grid made in accordance with the present invention.

A second conventional stamped battery grid identical to the grid used in Example 1 was substantially modified by rotating a major portion of grid wires by 45 degrees. (This version of a grid is depicted in FIGS. 1 and 3.) The modified grid was then pasted with a conventional positive paste for lead acid batteries and cured. The cured plate was sectioned with a cutting wheel in a direction transverse to the planar surface of the plate, polished, and photographed. The photograph is shown in FIG. 8 wherein the grid wire is designated at 80 and the paste is designated at 81. It can be seen from FIG. 8 that the plate prepared using the modified grid of Example 1(a) exhibited improved paste adhesion compared to the plate prepared using the grid of Example 1 (FIG. 7) and that the plate prepared using the modified grid of Example 1(a) exhibited a reduced number of cracks.

EXAMPLE 1(b)

A third conventional stamped battery grid identical to the grid used in Example 1 was substantially modified by stamping the grid wires to form a diamond-shaped cross-section. (This version of a grid is depicted in FIGS. 1 and 5.)

Figure 9:
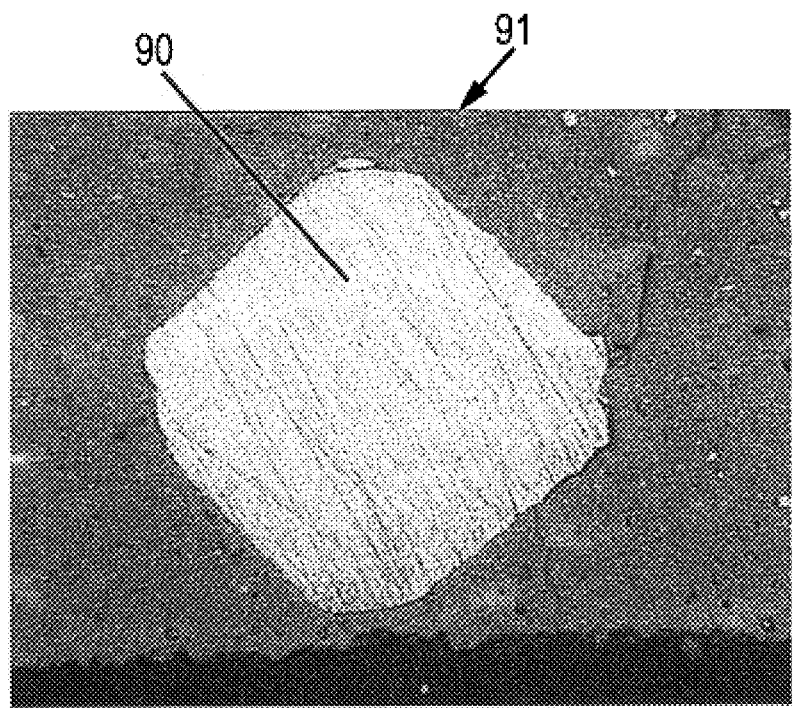
FIG. 9 is a photomicrograph of a transverse cross-section of a battery plate prepared using another version of a battery grid made in accordance with the present invention.

The modified grid was then pasted with a conventional positive paste for lead acid batteries and cured. The cured plate was sectioned with a cutting wheel in a direction transverse to the surface of the plate, polished, and photographed. The photograph is shown in FIG. 9. It can be seen from FIG. 9 (wherein the grid wire is designated at 90 and the paste is designated at 91) that the plate prepared using the modified grid of Example 1(b) exhibited improved paste adhesion compared to the plate prepared using the grid of Example 1 (FIG. 7) and that the plate prepared using the modified grid of Example 1(b) exhibited a reduced number of cracks.

EXAMPLE 1(c)

Figure 10:
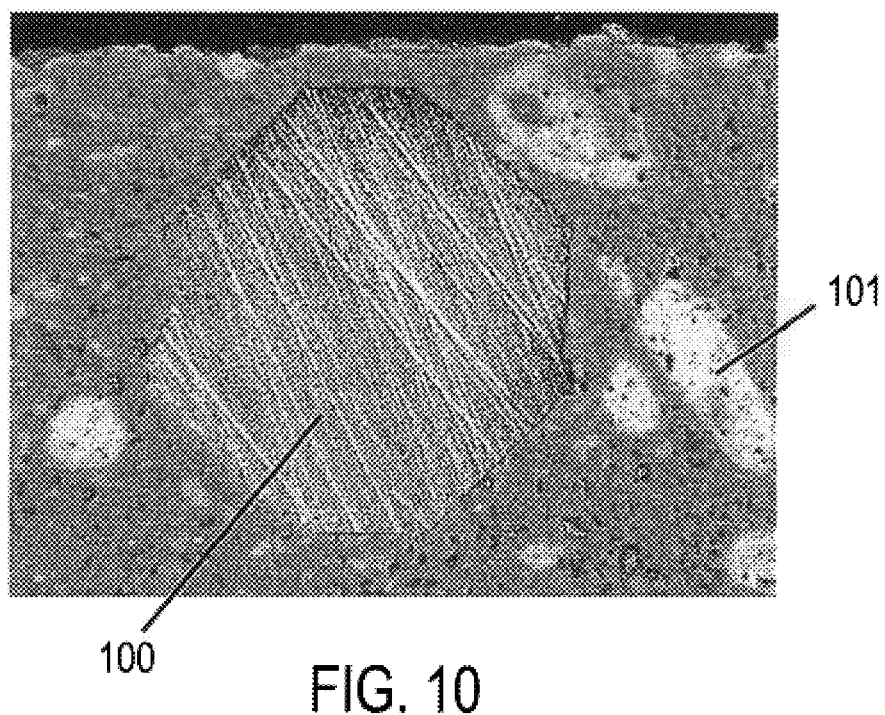
FIG. 10 is a photomicrograph of a transverse cross-section of a battery plate prepared using yet another version of a battery grid made in accordance with the present invention.
Figure 11:
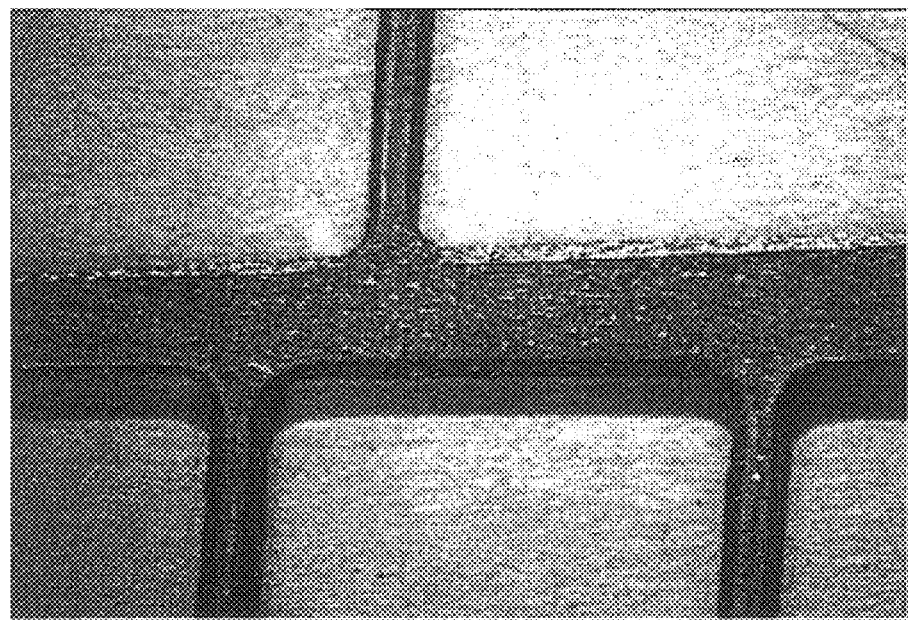
FIG. 11 is a photomicrograph that shows a front view of a battery grid made in accordance with the method of the present invention.
Figure 12:
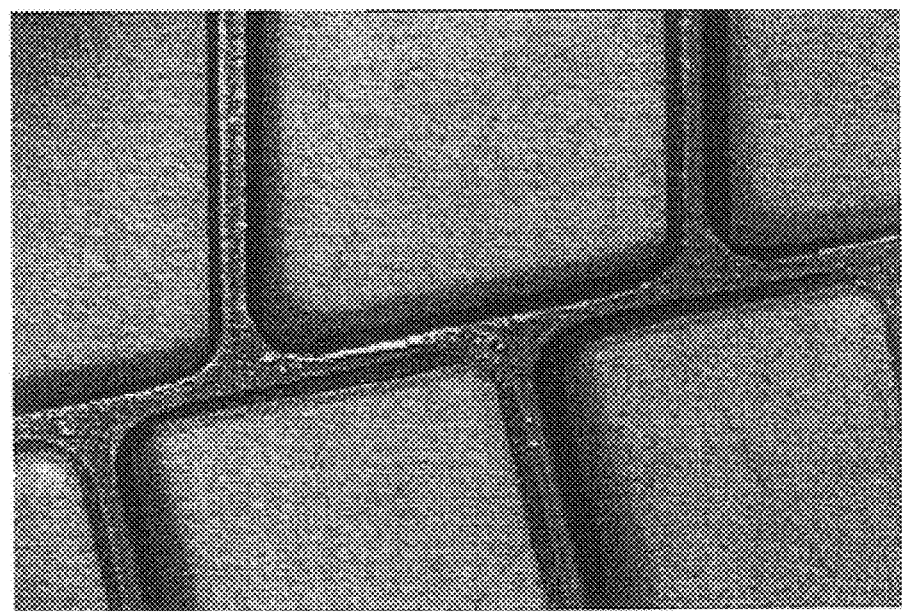
FIG. 12 is a photomicrograph that shows another front view of a battery grid made in accordance with the method of the present invention.
Figure 13:
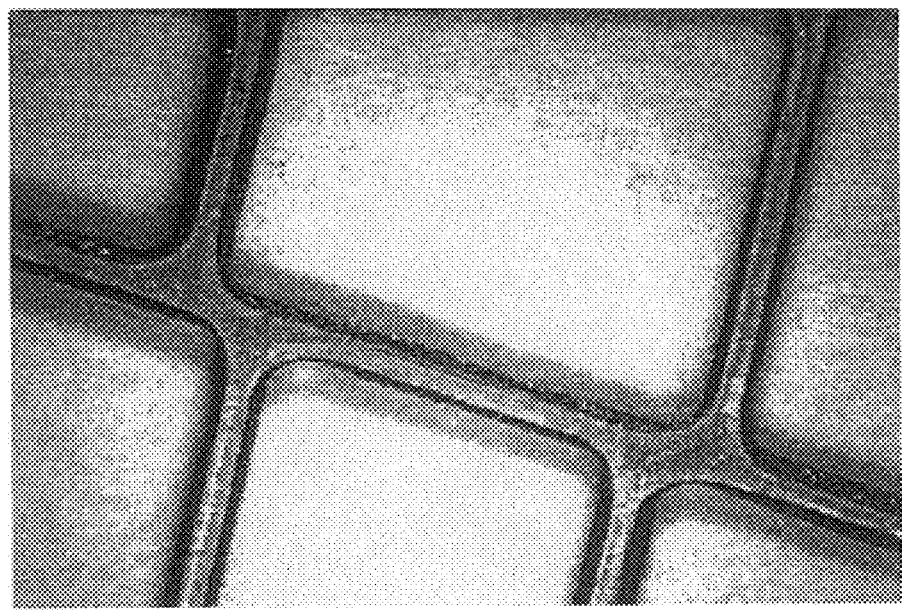
FIG. 13 is a photomicrograph that shows another front view of a battery grid made in accordance with the method of the present invention.
Figure 14:
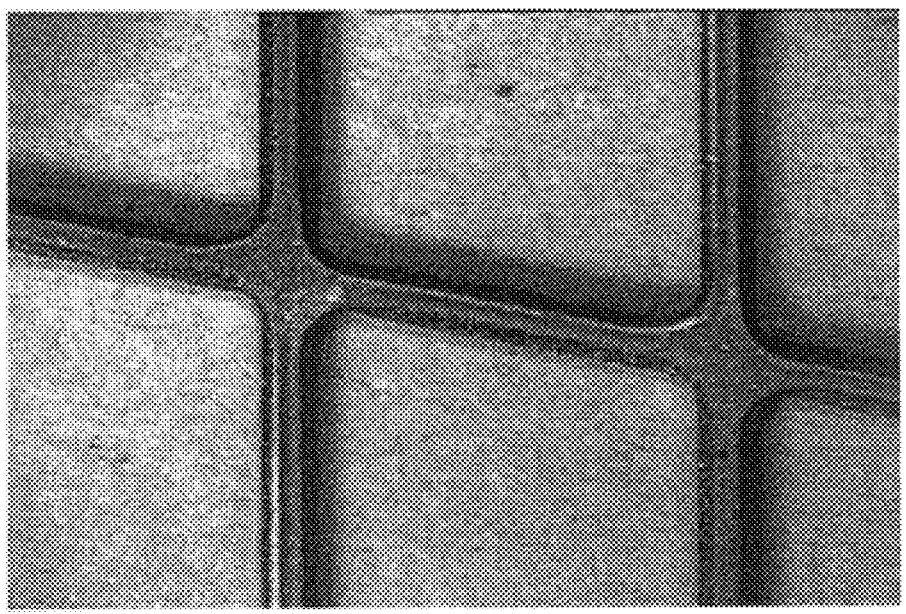
FIG. 14 is a photomicrograph that shows another front view of a battery grid made in accordance with the method of the present invention.

A fourth conventional stamped battery grid identical to the grid used in Example 1 was substantially modified by stamping the grid wires to form an octagonal shaped cross-section. (This version of a grid is depicted in FIGS. 1 and 2.) The modified grid was then pasted with a conventional positive paste for lead acid batteries and cured. The cured plate was sectioned with a cutting wheel in a direction transverse to the surface of the plate, polished, and photographed. The photograph is shown in FIG. 10. It can be seen from FIG. 10 (wherein the grid wire is designated at 100 and the paste is designated at 101) that the plate prepared using the modified grid of Example 1(c) exhibited improved paste adhesion compared to the plate prepared using the grid of Example 1 (FIG. 7) and that the plate prepared using the modified grid of Example 1(c) exhibited a reduced number of cracks.

EXAMPLE 2

Vibration weight loss is a very good measure to evaluate the strength of a battery plate. In order to demonstrate the effectiveness of the present invention, two battery plates were prepared. The first battery plate was prepared using the procedure of Example 1, and the second battery plate was prepared using the procedure of Example 1(c). The control plate of Example 1 and the plate of the present invention as described as Example 1(c) were then placed on a platform vibrating at a frequency of about 60 hertz with an amplitude of about three millimeters for one minute. The plate weights before and after vibration were compared. On average, the control plates of Example 1 lost 16 times the battery paste that was lost in plates formed in accordance with the present invention of Example 1(c). This test demonstrated that when assembled into battery plates, battery grids manufactured in accordance with the present invention improve paste adhesion between the grid and the paste.

EXAMPLE 3

Batteries made of conventional stamped grids and grids prepared in accordance with the present invention as described in Example 1(c) were cycled in accordance with the SAE J240 life test procedure at a temperature of 167° F. to measure the service life. Fourteen batteries having grids prepared in accordance with Example 1(c) and ten control batteries having conventional stamped grids were tested. The average number of cycles for batteries having grids prepared in accordance with Example 1(c) was 2.7 times the average number of cycles for the control batteries. This demonstrates that batteries including grids made in accordance with the present invention will have better cycle life performance than batteries including conventional grids.

Thus, the present invention provides a method that can increase the adherence of battery active material to a battery grid produced by a continuous process, such as strip expansion, strip stamping, or continuous casting, without the need for additional materials such as treatment chemicals or metal coatings. The method of the present invention increases the cycle life of a battery by enhancing the adhesion between the battery paste material and the battery grid. The method of the invention modifies the wires of a battery grid made from a continuous process to mimic the wire shape observed in a book mold gravity cast battery grid so that battery paste can flow around the grid wires to improve the plate strength after pasting. As a result, a battery manufacturer can take advantage of a low cost continuous grid making process without the drawbacks associated with inadequate paste adhesion.

Although the present invention has been described in considerable detail with reference to certain preferred embodiments, one skilled in the art will appreciate that the present invention can be practiced by other than the preferred embodiments, which have been presented for purposes of illustration and not of limitation. Therefore, the spirit and scope of the appended claims should not be limited to the description of the preferred embodiments contained herein.

What is claimed is:

1. A method of making a plurality of battery plates, the method comprising:
    forming a strip of interconnected battery grids from a grid material, each interconnected battery grid including a grid network bordered by at least one frame element, one of the frame elements having a current collector lug, the grid network comprising a plurality of spaced apart grid wire elements, each grid wire element having opposed ends, each opposed end being joined to one of a plurality of nodes to define a plurality of open spaces in the grid network;
    deforming at least a portion of the grid wire elements at a position intermediate the opposed ends of the grid wire element such that a first transverse cross-section taken at the position intermediate the opposed ends of the grid wire element differs from a second transverse cross-section taken at one of the opposed ends of the opposed ends of the grid element;
    applying battery paste to the strip; and
    cutting the strip to form a plurality of battery plates,
    wherein the grid network and each of the frames define opposed planar surfaces, and each first transverse cross-section does not extend above or below the planar surfaces.

2. The method of claim 1 wherein the step of deforming at least a portion of the grid wire elements comprises:
    stamping the grid wire element at the position intermediate the opposed ends of the grid wire element.

3. The method of claim 2 wherein:
    the first transverse cross-section substantially has a shape selected from group consisting of diamond, oval, rhomboid, hexagon, and octagon.

4. The method of claim 1 wherein the step of forming a strip of interconnected battery grids from a grid material comprises:
    feeding a continuous strip of the grid material along a linear path aligned with the longitudinal direction of the strip; and
    punching grid material out of the strip to form the strip of interconnected battery grids.

5. The method of claim 4 wherein:
the continuous strip of the grid material is formed by a continuous casting process.

6. The method of claim 4 wherein:
the continuous strip of the grid material is formed by a rolling process.

7. The method of claim 1 wherein the step of forming a strip of interconnected battery grids from a grid material comprises:
feeding a continuous strip of the grid material along a linear path aligned with the longitudinal direction of the strip;
piercing apertures in the strip of grid material; and
laterally expanding the strip of grid material to form the strip of interconnected battery grids.

8. The method of claim 1 wherein the step of forming a strip of interconnected battery grids from a grid material comprises:
melting the grid material;
continuously casting the grid material to form a continuous web; and
rolling the web to form the strip of interconnected battery grids.

9. The method of claim 1 wherein the step of forming a strip of interconnected battery grids from a grid material comprises:
melting the grid material; and
continuously casting the grid material to form the strip of interconnected battery grids.

10. The method of claim 1 further comprising the step of deforming at least a portion of the nodes before applying battery paste to the strip.

11. A method of making a plurality of battery grids, the method comprising:
forming a strip of interconnected battery grids from a grid material, each interconnected battery grid including a grid network bordered by at least one frame element, one of the frame elements having a current lug, the grid network comprising a plurality of spaced apart grid wire elements, each grid wire element having opposed ends, each opposed end being joined to one of a plurality of nodes to define a plurality of open spaces in the grid network;
deforming at least a portion of the grid wire elements at a position intermediate the opposed ends of the grid wire element such that a first transverse cross-section taken at the position intermediate the opposed ends of the grid wire element differs from a second transverse cross-section taken at one of the opposed ends of the grid wire element; and
cutting the strip to form a plurality of battery grids,
wherein the grid network and each of the frames define opposed planar surfaces, and each first transverse cross-section does not extend above or below the planar surfaces.

12. The method of claim 11 wherein the step of deforming at least a portion of the grid wire elements comprises:
stamping the grid wire element at the position intermediate the opposed ends of the grid wire element.

13. A method of making a plurality of battery plates, the method comprising:
melting a grid material;
continuously casting the grid material to form a continuous strip;
rolling the strip;
punching grid material out of the strip to form interconnected battery grids, each interconnected battery grid including a grid network bordered by a frame, the frame having a current collector lug, the grid network comprising a plurality of spaced apart grid wire elements, each grid wire element having opposed ends, each opposed end being joined to one of a plurality of nodes to define a plurality of open spaces in the grid network;
stamping at least a portion of the grid wire elements at a position intermediate the opposed ends of the grid wire element such that a first transverse cross-section taken at the position intermediate the opposed ends of the grid wire element differs from a second transverse cross-section taken at one of the opposed ends of the grid wire element;
applying battery paste to the strip; and
cutting the strip to form a plurality of battery plates,
wherein the grid network and each of the frames define opposed planar surfaces, and each first transverse cross-section does not extend above or below the planar surfaces.

14. The method of claim 13 wherein:
the first transverse cross-section substantially has a shape selected from group consisting of diamond, oval, rhomboid, hexagon, and octagon.

15. A method of extending the cycle life of a lead-acid storage battery having a positive plate, the method comprising:
melting a lead alloy grid material;
continuously casting the grid material to form a continuous strip;
rolling the strip;
punching grid material out of the strip to form interconnected battery grids, each interconnected battery grid including a grid network bordered by a frame, the frame having a current collector lug, the grid network comprising a plurality of spaced apart grid wire elements, each grid wire element having opposed ends, each opposed end being joined to one of a plurality of nodes to define a plurality of open spaces in the grid network;
stamping at least a portion of the grid wire elements at a position intermediate the opposed ends of the grid wire element such that a first transverse cross-section taken at the position intermediate the opposed ends of the grid wire element differs from a second transverse cross-section taken at one of the opposed ends of the grid wire element;
applying battery paste to the strip; and
cutting the strip to form a plurality of positive plates,
wherein the grid network and each of the frames define opposed planar surfaces, and each first transverse cross-section does not extend above or below planar surfaces.

16. The method of claim 15 wherein:
the first transverse cross-section substantially has a shape selected from group consisting of diamond, oval, rhomboid, hexagon, and octagon.

17. A method of making a battery grid, the method comprising:
forming a preform battery grid, the preform battery grid including a grid network bordered by at least one frame element, one of the frame elements having a current collector lug, the grid network comprising a plurality of spaced apart grid wire elements, each grid wire element having opposed ends, each opposed end being joined to one of a plurality of nodes to define a plurality of open spaces in the grid network; and deforming at least a portion of the grid wire elements of the preform battery grid at a position intermediate the opposed ends of the grid wire element such that a first transverse cross-section taken at the position intermediate the opposed ends of the grid wire element differs from a second transverse cross-section taken at one of the opposed ends of the grid wire element, wherein the grid network and each of the frames define opposed planar surfaces, and each first transverse cross-section does not extend above or below the planar surfaces.

18. The method of claim 17 wherein:

the first transverse cross-section substantially has a shape selected from group consisting of diamond, oval, rhomboid, hexagon, and octagon.

19. A grid for a battery comprising:

a grid network bordered by at least one frame element, one of the frame elements having a current collector lug, the grid network comprising a plurality of spaced apart grid wire elements, each grid wire element having opposed ends, each opposed end being joined to one of a plurality of nodes to define a plurality of open spaces, at least a portion of the grid wire elements having a first transverse cross-section taken at a position intermediate the opposed ends of the grid wire element that differs from a second transverse cross-section taken at one of the opposed ends of the grid wire element, wherein the grid network and each of the frames define opposed planar surfaces, and each first transverse cross-section does not extend above or below the planar surfaces.

20. The grid of claim 19 wherein:

the second transverse cross-section is substantially rectangular.

21. The grid of claim 19 wherein:

the first transverse cross-section is a substantially rectangular cross-section rotated about 20 to about 70 degrees in relation to the second transverse cross-section.

22. The grid of claim 21 wherein:

the first transverse cross-section is a substantially rectangular cross-section rotated about 35 to about 55 degrees in relation to the second transverse cross-section.

23. The grid of claim 19 wherein:

the first transverse cross-section substantially has a shape selected from group consisting of diamond, oval, rhomboid, hexagon, and octagon.

24. The grid of claim 19 wherein:

the first transverse cross-section is substantially a diamond shape.

25. The grid of claim 19 wherein:

the first transverse cross-section is substantially a hexagon shape.

26. The grid of claim 19 wherein:

the first transverse cross-section is substantially a octagon shape.

27. The grid of claim 19 wherein:

the first transverse cross-section is substantially an oval shape.

28. The grid of claim 19 wherein:

the first transverse cross-section is substantially a rhomboid shape.

* * * * *